March 30, 1954  D. W. EPSTEIN  2,673,977
SCHMIDT TELEVISION PROJECTOR
Filed Jan. 3, 1949
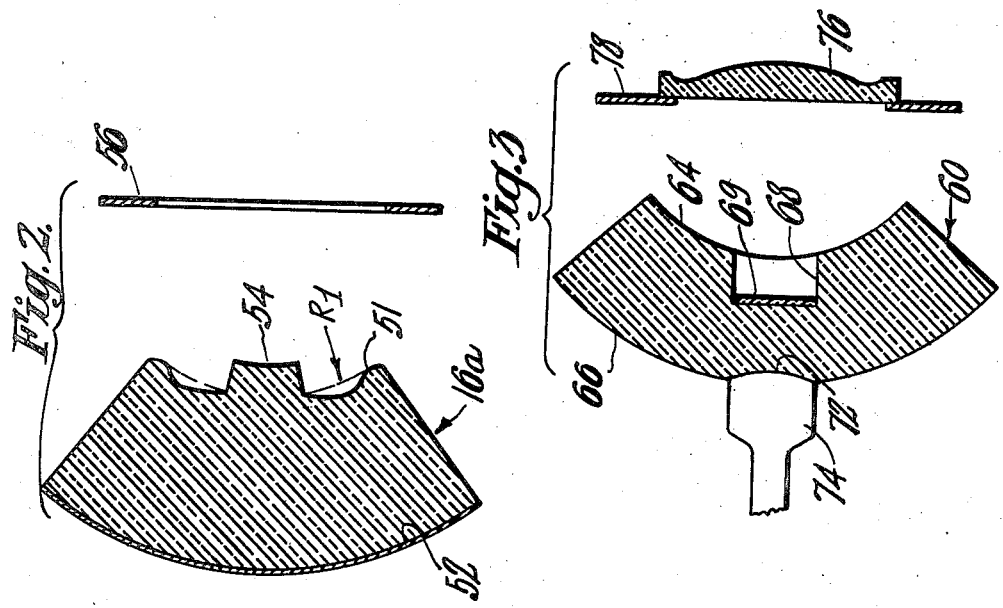
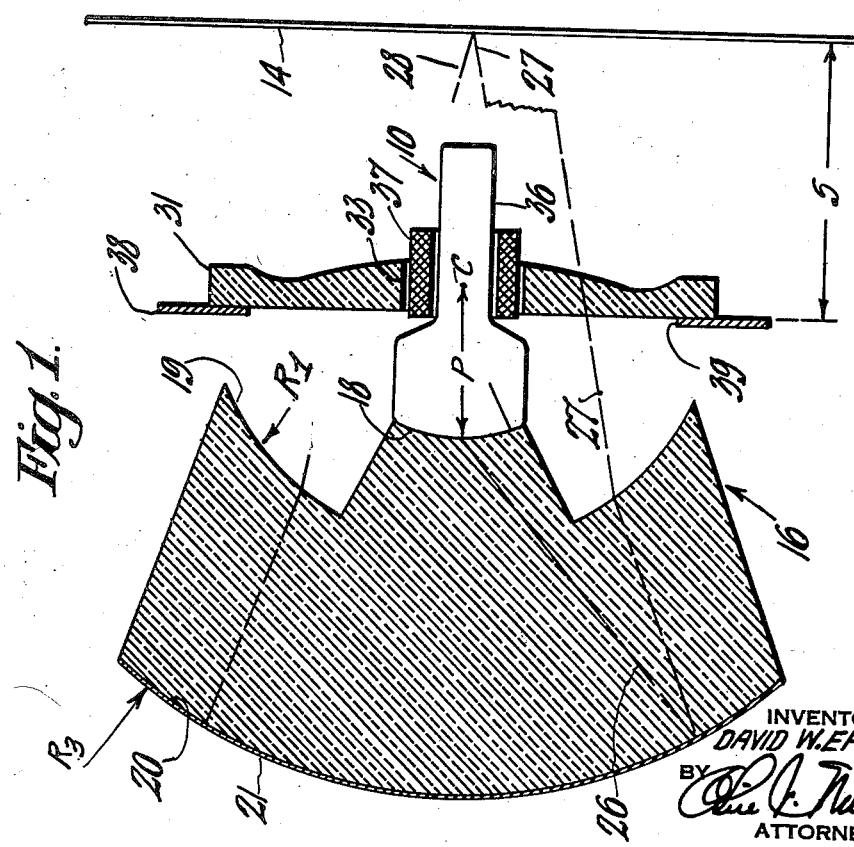
INVENTOR
DAVID W. EPSTEIN
BY
ATTORNEY Patented Mar. 30, 1954

2,673,977

UNITED STATES PATENT OFFICE 2,673,977

SCHMIDT TELEVISION PROJECTOR

David W. Epstein, Princeton, N. J., assignor to Radio Corporation of America, a corporation of Delaware Application January 3, 1949, Serial No. 68,877

1 Claim. (Cl. 340—370)

The present invention relates to image projection systems of the reflective type which are partly immersed and more particularly, but not necessarily exclusively, to novel systems in which the light paths form a reflective element passing through an optical medium having a selected index of refraction to an exit surface having appreciable curvature.

In accordance with the invention, novel projector systems are provided which are generally of the type requiring one or more reflectors and spherical and aspherical refracting surfaces, which differs from previous projectors by having an optical medium which provides a plurality of optically active surfaces for directing light from luminous images produced by the operation of a cathode ray tube or an equivalent image producing device. It will be understood that the cathode ray tube image is what is usually referred to as the object of the projector system. The object may be a film, slide or any illuminated surface. Known projection systems in which an appreciable portion of the light path from the image to the viewing surface is in a medium of index N perform very poorly for off-axis points. While such prior art immersed systems were possessed of desirable features such, for example, as high light gathering power, the lack of definition in the projected image at points remote from the axis of the system detracted considerably from the usefulness of known immersed systems. The present invention is based in part upon the discovery that if a partially immersed system is constructed to have an exit boundary for light which is directed to an image viewing surface which has a high degree of curvature, then off-axis performance is materially improved and other advantages are realized.

Accordingly, the invention has for its principal aim to provide a novel projector system of the reflective optical type having a high efficiency so that observable illumination on the image viewing surface may be substantially twice that observable with known projector systems having a comparable uniformity of illumination and definition of the projected image.

Another aim or object of the invention is to provide an image projection system having improved focus for off-axis points.

A further object is to provide in a novel manner for distributing optical correction for spherical aberration introduced into the system by a spherical reflective member.

A further object is to provide a novel reflective optical projecting system in which a substantial portion of the light path from an image producing device to a viewing screen lies within an optical medium having a curved exit boundary surface.

Still another object is to provide an image projecting system for exhibiting magnified luminous images with enhanced brightness having for a given magnification a decreased throw thereby permitting a compact design of support and/or enclosure support projecting system.

A still further object of the invention is to provide an image projecting system of the reflective optical type in which the optically active reflecting surface is protected against dust oxidation etc., therefore, substantially to prevent optical deterioration.

A still further object of the invention is to provide a novel image projecting system of the reflective optical type employing a cathode ray tube wherein the tube face is so positioned with respect to an optical element of the system that the two are automatically lined up without requiring supports which would block a portion or portions of the light path.

Other objects and advantages of the present invention will, of course, become apparent and immediately suggest themselves to those skilled in the art to which the invention is directed from a reading of the following specification in connection with the accompanying drawing in which:

Fig. 1 is a side elevational view, partly in section, of projection apparatus embodying the invention;

Fig. 2 is a view similar to Fig. 1 but showing a projector embodying the invention in a modified form; and Fig. 3 is a view in sectional elevation of a projecting optical system in accordance with the invention showing a further embodiment of the invention.

In the illustrative example of Fig. 1 of the drawings, it is assumed that image signals are received from a radio transmitter and are then suitably amplified and demodulated in a television receiver. In the embodiment of the invention illustrated in Fig. 1 the invention is applied to a projector of the type discussed above which includes a spherical mirror and an aspheric correcting plate. The resulting image signal is supplied through a video amplifier (not shown) to appropriately modulate the electron beam within the cathode ray tube 10.

With the tube 10 in operation, the reproduced image appearing on the end thereof is projected upon an image viewing surface such as that provided by a screen 14, by means of the improved optical system provided by the optical medium shown as a unitary optical member 16. The optical medium of which the part 16 is composed provides a partially immersed region of index of refraction N. The immersed region is optically bounded by three portions 18, 19 and 20 of spheres of radius of curvature $R_0$, $R_1$ and $R_3$.

The spherical boundary 20 provides a reflective surface in the form of a spherical mirror. This surface or boundary is silvered or aluminized as indicated by reference character 21. The coating which provides the reflective surface may be protected in suitable manner, for example by in turn coating it with varnish or by plating.

The optical part or member 16 may be of glass selected in view of its optical characteristics, a plastic such as "Lucite" (methyl methacrylate), "polystyrene" or other suitable transparent substance which may be cast, ground, molded under pressure or otherwise suitably worked to provide the desired configuration of its light reflecting and light refracting surfaces. The part 16 may conveniently be in the form of a transparent shell having the spherical boundary surfaces 18, 19 and 20 which will confine a liquid of suitable index of refraction. The liquid may be clear mineral oil and the shell may be made of one of the materials named above by way of example for the member 16.

The active face of the tube 10 from which the luminous image is projected is in optical contact with the spherical boundary 18. This may be achieved by pressing the tube face into intimate contact with the spherical surface 18 or a cement such as Canada balsam may be used to cement the tube face in desired optical contact with the surface 18. Clear mineral oil may also be used for the purpose of insuring optical contact. If the projector is mounted so that the surface 20 is at the bottom then tube 10 can sit on surface 18 and the tube 10 is automatically lined up without requiring supports which would block a portion or portions of the light path.

The television image produced on the face of the tube 10 is projected along an optical path, conventionally represented at 26 toward the spherical surface 20. The image which has been projected upon the reflecting surface 20 is then reflected therefrom along the optical paths conventionally represented at 27 and 28 toward the viewing screen 14. The viewing screen 14 for the sake of convenience of illustration is shown in proximity to the base and of the tube 10 but it will be understood that the throw is longer in proportion to that conventionally shown in the drawing. This is indicated by the break in the drawing. At an intermediate point in the optical path an aspheric zone plate 31 (also termed a "correcting plate" or "correcting lens") is positioned to receive the light reflected from the reflecting surface 20. The correcting plate 31 has a central opening 33 for the purpose of accommodating the tube neck 36 and if desired the deflecting yoke 37 for producing deflection of the cathode ray beam within the tube 10. Due to the fact that the spherical aberration of the mirror surface 20 is partially corrected by the spherical surface 19, the correcting lens 31 is very substantially weaker than it would be in the absence of surface 19.

A stop member 38 having an aperture 39 is located substantially at or adjacent to the center of curvature C of the spherical reflecting surface 20 and will, in general, improve the operation of the optical system. The image plane represented in the illustrative example by a surface of the screen 14 is located at the distance S from the apex of the correcting lens 31.

In accordance with the invention, the curvature of $R_0$ is primarily determined by the focal length of the system $$f = \frac{1}{\frac{2}{R_3} + \frac{N-1}{R_1} - \frac{N(n-1)}{r}}$$

so that the image occurs on a flat plane. The surface $R_3$ is silvered or aluminized and constitutes the mirror. $R_1$ which is substantially concentric with $R_3$ is the exit surface for the light after reflection at $R_3$. The correcting lens of index of refraction $n$ and central radius of curvature $r$, as well as the major stop, are located at C. The distance between the surface 18 and C is $$p = \frac{f(m-N)}{m}$$

where $m$ is the magnification for which the system is designed. The image plane is located at the distance $$S = mp$$

from the correcting lens.

Fig. 2 of the drawings shows an embodiment of the invention in which the function of the correcting plate 31 of Fig. 1 is performed by a figured surface 51 on the element 16a. This figured surface corresponds to the spherical exit surface 19 of Fig. 1 and, therefore, its average contour will be spherical having a radius $R_1$ as discussed above in connection with the description of the system of Fig. 1, that is to say the aspheric figuring is superimposed on the spherical surface of radius $R_1$. The outer spherical surface 52 of the member 16a is treated so that it serves as a reflective surface similar in all respects to the surface 20 of Fig. 1 of the drawings. Surface 54 receives the cathode ray tube (not shown in Fig. 3 for the sake of convenience of illustration) in the same manner as the surface 18 of Fig. 1 of the drawings. A stop member 56 is located substantially at the center of curvature of spherical surface 52 between the viewing screen (not shown) and the optical element 16a.

Fig. 3 of the drawings shows a further embodiment of the invention which employs a plane mirror somewhat in the manner disclosed and claimed in Epstein 2,295,779, granted on September 15, 1942. Referring to Fig. 3, there is shown an optical element 60 which presents a spherical exit boundary surface 64 and a spherical reflecting surface 66. The surfaces 64 and 66 are substantially concentric and the surface 66 is silvered or otherwise treated to provide a concave spherical mirror. Member 66 is provided with a bore 68, the bottom of which is silvered as indicated by reference character 69 to provide a plane mirror facing a concave substantially spherical depression 72 formed in the surface 66. This concave depression 72 provides a seat for the active face of a cathode ray tube 74. Optical contact between the tube face and the depression 72 is insured as pointed out above by the use of clear mineral oil or Canada balsam.

The plane mirror provided as indicated at reference character 69 is used to reverse the position of the tube 74 with respect to the position of the tube 10 in the system shown illustratively in Fig. 1 of the drawings. A correcting lens 76 is positioned in the optical path leading to a suitable viewing screen (not shown). A stop or aperture member 78 is provided which is located generally in the manner described above in connection with Figs. 1 and 2 of the drawings. The arrangement of Fig. 3 has the advantage of requiring less volume of material and is particularly useful for projector of small dimensions where the deflecting instrumentality would perhaps block an undue amount of light thus preventing it from reaching the viewing screen. The aspheric figuring of the correcting lens may be as shown in Fig. 2 superimposed on surface 64, and the correcting lens 76 omitted leaving the aperture stop at substantially the center of curvature of surface 66. The semi-immersing medium shown in the figures may be split into a number of concentric menisci of different indices of refraction for purposes of ease of construction as well as correction of chromatic apparation. These menisci may be composed of solid optical media such as glass or plastic or of liquid or semi-solid. Optical contact must be maintained between the surfaces of contact of the various menisci.

What is claimed is:

A projector for images produced in operation of a cathode ray tube comprising an aspheric correcting plate and a viewing screen, means providing an immersed region for a portion of the light path in said projector from the tube to the viewing screen, said immersed region having an index of refraction N and being bounded by three portions of spheres, one of said portions being in optical contact with the face of the tube and having a radius of curvature determined by the focal length of the system, the surface of another of said portions being reflective to constitute a mirror, and the third surface being the exit surface for light reflected at the surface of the reflective portion, said reflective surface and said exit surface being concentric and having their centers located at a distance $p$ from the surface in optical contact with the tube face determined by the formula $$p = \frac{f(m-N)}{m}$$

light from said exit surface passing therefrom through said correcting plate to said screen.

DAVID W. EPSTEIN.

References Cited in the file of this patent

UNITED STATES PATENTS

| Number | Name | Date |
|---|---|---|
| 2,229,302 | Martin et al. | Dec. 21, 1941 |
| 2,295,779 | Epstein | Sept. 15, 1942 |
| 2,295,802 | Nicoll | Sept. 15, 1942 |
| 2,305,855 | Epstein et al. | Dec. 22, 1942 |
| 2,378,301 | Kaprelian | June 12, 1945 |
| 2,415,211 | Law | Feb. 4, 1947 |
| 2,454,144 | Epstein | Nov. 16, 1948 |
| 2,458,132 | Baker | Jan. 4, 1949 |
| 2,476,898 | Nicoll | July 19, 1949 |
| 2,477,331 | Epstein | July 26, 1949 |

FOREIGN PATENTS

| Number | Country | Date |
|---|---|---|
| 610,798 | Great Britain | Oct. 20, 1948 |

OTHER REFERENCES

Telescoptics, Scientific American, August 1939, pages 118–123.